US012524449B2

(12) United States Patent
Smyth et al.

(10) Patent No.: US 12,524,449 B2
(45) Date of Patent: Jan. 13, 2026

(54) CHAT-POWERED SEARCH USING ARTIFICIAL INTELLIGENCE

(71) Applicant: Shutterstock, Inc., New York, NY (US)

(72) Inventors: Raymond Lúí Smyth, Dublin (IE); Christopher Loy, London (GB); Keenan Kadam, London (GB); Timothy Williams, Woking (GB)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 18/672,576

(22) Filed: May 23, 2024

(65) Prior Publication Data

US 2025/0363140 A1    Nov. 27, 2025

(51) Int. Cl.
*G06F 16/3329*    (2025.01)
*G06F 16/334*    (2025.01)

(52) U.S. Cl.
CPC ...... *G06F 16/3329* (2019.01); *G06F 16/3344* (2019.01)

(58) Field of Classification Search
CPC .................................................. G06F 16/3329
See application file for complete search history.

(56) References Cited

U.S. PATENT DOCUMENTS

| | | | | |
|---|---|---|---|---|
| 2019/0124020 | A1* | 4/2019 | Bobbarjung | H04L 51/02 |
| 2019/0377790 | A1* | 12/2019 | Redmond | G06F 40/205 |
| 2020/0117709 | A1* | 4/2020 | Galitsky | G06N 20/00 |
| 2021/0042110 | A1* | 2/2021 | Basyrov | G06F 40/295 |
| 2021/0342711 | A1* | 11/2021 | Mokeev | G06F 16/3347 |
| 2023/0205824 | A1* | 6/2023 | Jablokov | G06F 16/93 707/737 |
| 2023/0274094 | A1* | 8/2023 | Tunstall-Pedoe | G06F 40/30 704/9 |
| 2024/0289361 | A1* | 8/2024 | Batina | G06F 16/3328 |

OTHER PUBLICATIONS

EPO—International Search Report and Written Opinion for related International Appln. No. PCT/US2025/029172 mailed on Sep. 24, 2025, 10 pages.
Yizhou Chi et al., "Clairnet: Augmented Language Models to Ask Clarification Questions for Retrieval." arxiv.org; Cornell Univ. Library, Ithica NY;Apr. 28, 2024, retrieved online on Sep. 25, 2025; 10 pgs.

* cited by examiner

*Primary Examiner* — Van H Oberly
(74) *Attorney, Agent, or Firm* — McDermott Will & Schulte LLP

(57) ABSTRACT

Methods, systems, and storage media for refining search queries through interactive conversational exchange are disclosed. Exemplary implementations may receive a first search input from a user describing a desired asset such as an image. Aspects implementations may also interact with the user via a chat interface to solicit additional details about the desired asset in response to the first search input, construct a search query based on the first search input and the additional details solicited from the user, and submit the search query to a search service to retrieve relevant asset data for the user.

18 Claims, 12 Drawing Sheets

FIG. 7A

CHAT-POWERED SEARCH USING ARTIFICIAL INTELLIGENCE

TECHNICAL FIELD

The present disclosure generally relates to search, and more particularly to chat-powered search using artificial intelligence (AI), providing users with search results that closely align with their intended goals and objectives.

BACKGROUND

Search engines have long been the cornerstone for users to find images that align with their needs. Traditional search engines rely on keyword matching, where users input specific terms and the engine retrieves images tagged with those keywords. However, this approach often leads to irrelevant results or an overwhelming number of images that only loosely relate to the user's intent. The advent of vector-based search technologies has aimed to address this by understanding the context and meaning behind queries, offering more nuanced results. vector-based search utilizes natural language processing and machine learning to interpret the intent behind search terms, but crafting an effective query that captures the complexity of a user's needs remains a challenge. Users often struggle to articulate their search intent in a way that leverages the full potential of vector-based search capabilities.

BRIEF SUMMARY

The subject disclosure provides for systems and methods for search. A user is allowed to refine their asset search through an interactive, conversational process that generates more precise queries, leading to more relevant and satisfying search results. For example, the system encourages users to specify details they may not have initially considered, thus narrowing down the search and saving time by reducing irrelevant outcomes.

One aspect of the present disclosure relates to a method for refining asset search queries through interactive conversational exchange. The method may include receiving a first search input from a user describing a desired asset. The method may include interacting with the user via a chat interface to solicit additional details about the desired asset in response to the first search input. The method may include constructing a search query based on the first search input and the additional details solicited from the user. The method may include submitting the search query to a search service to retrieve relevant asset data for the user.

Another aspect of the present disclosure relates to a system configured for refining asset search queries through interactive conversational exchange. The system may include one or more hardware processors configured by machine-readable instructions. The processor(s) may be configured to receive a first search input from a user describing a desired asset. The processor(s) may be configured to interact with the user via a chat interface to solicit additional details about the desired asset in response to the first search input. The processor(s) may be configured to construct a search query based on the first search input and the additional details solicited from the user. The processor(s) may be configured to submit the search query to a search service to retrieve relevant asset data for the user.

Yet another aspect of the present disclosure relates to a non-transient computer-readable storage medium having instructions embodied thereon, the instructions being executable by one or more processors to perform a method for refining asset search queries through interactive conversational exchange. The method may include receiving a first search input from a user describing a desired asset. The method may include interacting with the user via a chat interface to solicit additional details about the desired asset in response to the first search input. The method may include constructing a search query based on the first search input and the additional details solicited from the user. The method may include submitting the search query to a search service to retrieve relevant asset data for the user.

Still another aspect of the present disclosure relates to a system configured for refining asset search queries through interactive conversational exchange. The system may include means for receiving a first search input from a user describing a desired asset. The system may include means for interacting with the user via a chat interface to solicit additional details about the desired asset in response to the first search input. The system may include means for constructing a search query based on the first search input and the additional details solicited from the user. The system may include means for submitting the search query to a search service to retrieve relevant asset data for the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 7A, 7B, and 7C illustrate a series of example views of an application configured for providing chat-powered search using artificial intelligence, in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Figure 1:
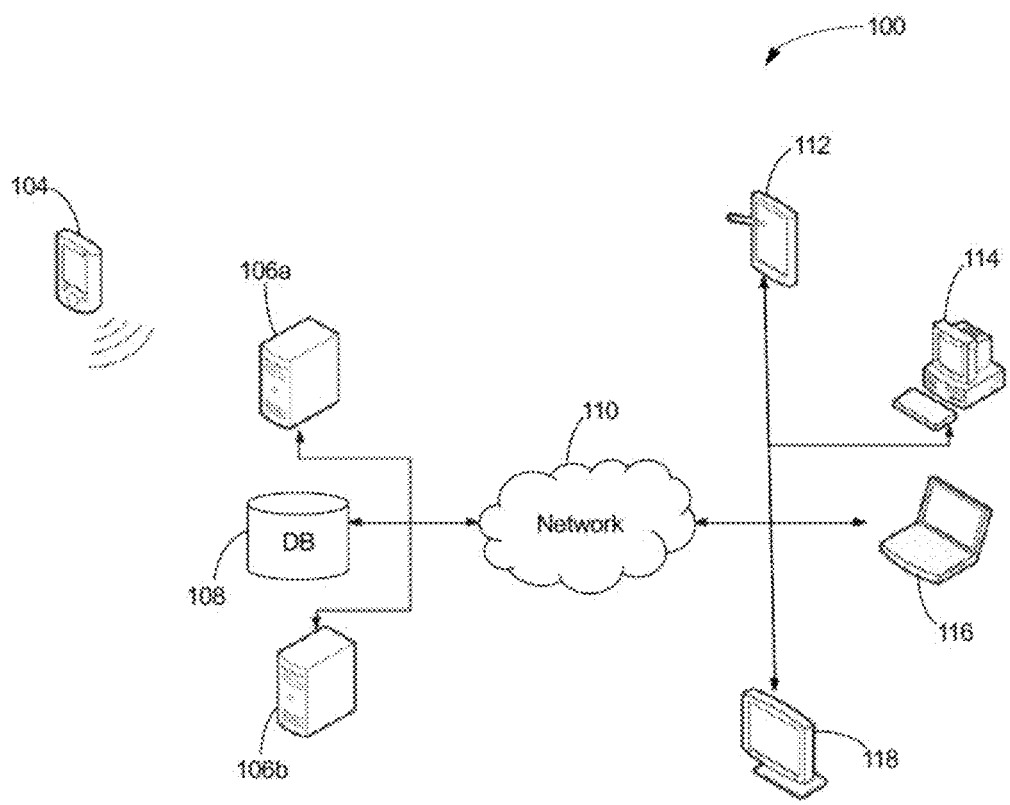
FIG. 1 is a block diagram illustrating an overview of an environment in which some implementations of the disclosed technology can operate.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices.

In some implementations, the environment 100 may include a server such as an edge server which receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network.

In some information retrieval systems, users may frequently encounter difficulties in formulating queries that accurately reflect their search intent. Traditional methods that rely on keyword matching may yield an excessive number of irrelevant results, while overly detailed queries may return no results at all. This binary outcome of either an abundance of weak matches or zero results is inefficient and frustrating for users seeking specific image content. Moreover, the ability of systems to handle complex queries is underutilized due to the users' inability to construct such queries. The challenge may lie in bridging the gap between a user's conceptual search intent and the system's capacity to comprehend and process intricate textual queries to produce meaningful and relevant image results.

The subject disclosure provides for systems and methods for search. A user is allowed to refine their asset search through an interactive, conversational process that generates more precise queries, leading to more relevant and satisfying search results. For example, the system encourages users to specify details they may not have initially considered, thus narrowing down the search and saving time by reducing irrelevant outcomes.

Implementations described herein address the aforementioned shortcomings and other shortcomings by providing an interactive method utilizing a chat-based large language model to assist users in refining their search queries for assets (e.g., images, videos, media content, etc.). This method may involve a conversational interface where the language model prompts the user with questions, thereby eliciting more detailed descriptions of the desired asset content. As the dialogue progresses, the language model may dynamically construct a detailed search query that encapsulates the user's refined intent. This query may then be processed by a search service capable of understanding complex textual queries, which in turn retrieves a curated set of relevant results.

The method may leverage the language model's ability to interpret and expand upon the user's initial input, guiding them towards a more precise expression of their search intent. By iteratively refining the search query through a natural language conversation, the system ensures that the search service can utilize its full potential to provide high-quality, relevant results. This interactive approach not only enhances the user's search experience but also capitalizes on the search engine's advanced capabilities, resulting in a more efficient and satisfying asset retrieval process.

According to some implementations, a system may include a chat-based interface that interacts with users in a conversational format. This interface may be designed to assist users in finding assets that match their search criteria. The system may utilize a large language model, which is a computer program trained to understand and generate human-like text, to interpret the user's input and guide the conversation. As the user provides more details about the desired asset, the language model may refine the search query to better match the user's intent.

Some implementations may feature a search service that operates in conjunction with the chat interface. This service may be capable of handling complex search queries and returning asset (e.g., image) data that corresponds to the refined search terms provided by the user. The search service may use a database where assets are tagged with keywords, allowing the system to match the user's query with relevant assets. The system may be designed to ensure that the search does not become too narrow, thereby avoiding scenarios where no results are returned.

In some implementations, the system may include a user interface that displays the asset results to the user. The interface may allow the user to select, download, or interact with the assets in various ways. The system may be configured to handle arbitrarily complex textual data as search queries, which may be based on the conversation between the user and the chat interface. The large language model may collect information from the conversation and use it to generate a query with a high degree of specificity, which may then be used by the search service to provide the user with asset data that closely aligns with their described needs.

Figure 2:
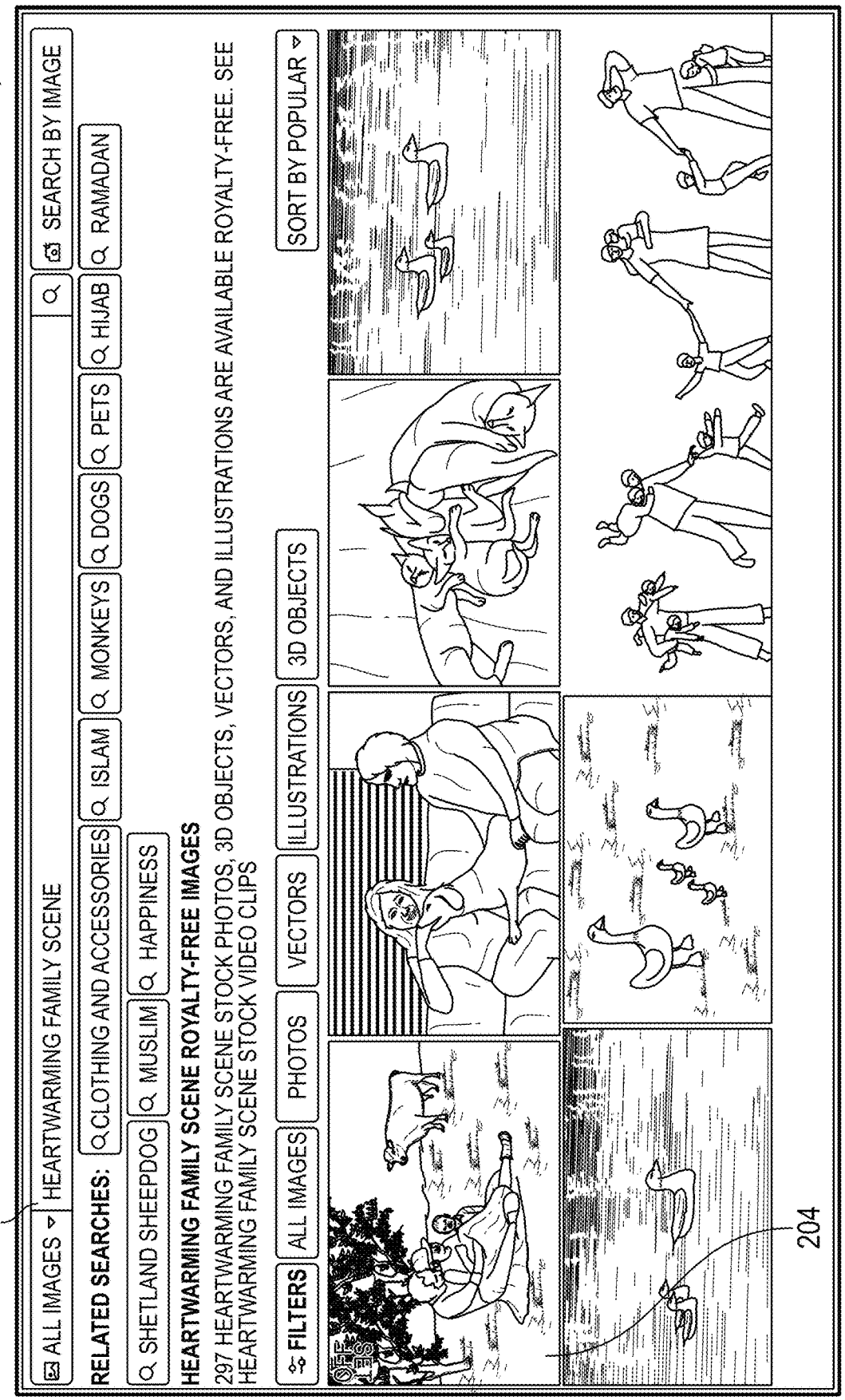
FIG. 2 illustrates an example view of an application configured for providing chat-powered search using artificial intelligence, in accordance with one or more implementations.

FIG. 2 illustrates an example view 200 of an application configured for providing search results based on textual search inputs. In the view 200, a user initiates a search query 202 for an image of a scene with a first search input, such as a "heartwarming family scene." The initial search may yield suboptimal results 204 due to a lack of sufficient keywords in the first search input to effectively narrow down the search results. By non-limiting example, the results of the search query may be presented to the user as click-through options associated with the extracted keywords. As shown in FIG. 2, the search results 204 appear to be scattered in theme and may not align with what the user intended or desired based on the first search input 202. According to embodiments, search results may be filtered by media type. Other related searched may be recommended to the user based on their first search input.

Figure 3:
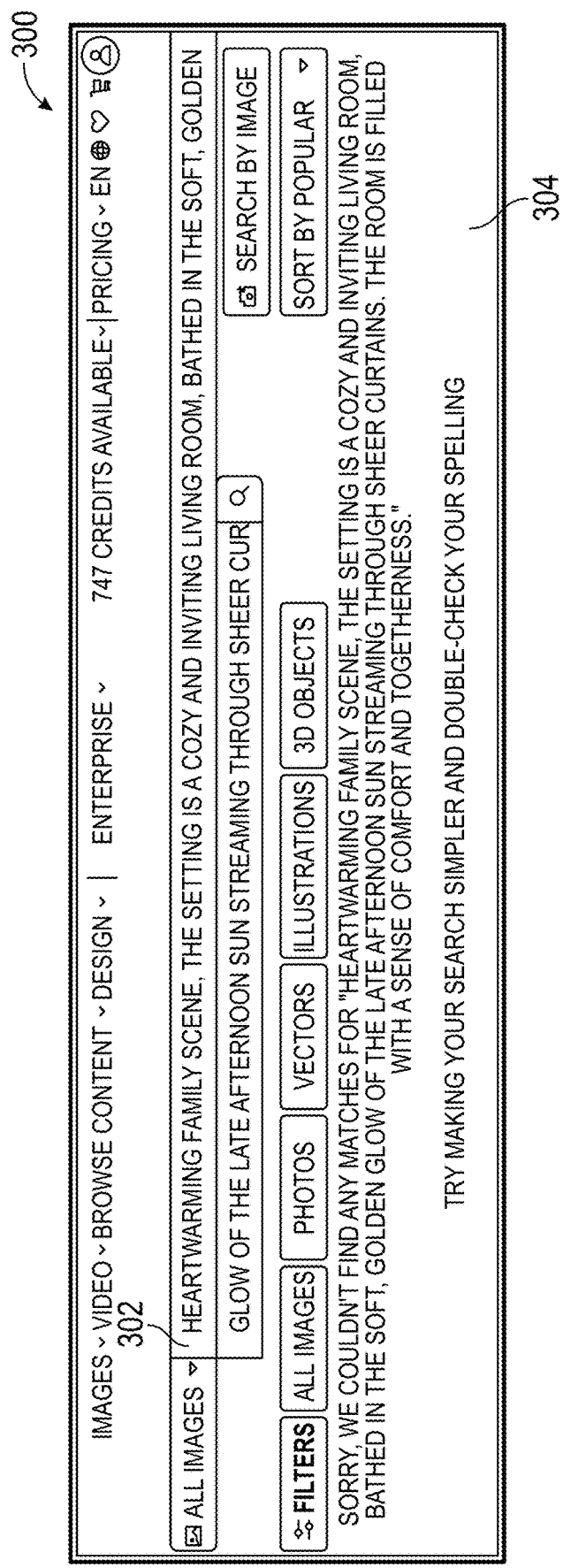
FIG. 3 illustrates an example view of an application configured for providing chat-powered search using artificial intelligence, in accordance with one or more implementations.

FIG. 3 illustrates an example view 300 of an application configured for providing search results based on textual search inputs. In the view 300, a user may input an excessive number of keywords in an attempt to refine their search query 302, inadvertently creating a new issue where the search database does not have all the keywords tagged as extensively as they are described in the user's input. This can result in a limitation on the number of keywords that can be effectively used in a search of the database. For instance, the keyword "golden glow" might be cataloged in the database under alternative descriptors such as a "soft, warm glow," leading to a situation where the actual image content matches the search intent, yet the overly specific keyword combination yields no results 304 due to the narrow search query 302.

Further, traditional chat-powered services using AI employ large prompts to generate new AI images. A user may provide creative requests to a chat interface and receive back questions. The chat interface may provide natural language responses to the user (e.g., asking questions) using a language model. A chat history for a conversation between the user and chat interface (i.e., the language model) may be used to build a detailed, relatively large generative prompt. The prompt is sent to an AI generation service configured to generate images based on prompts. The generated images are created as new results based on the prompts. This approach fails to leverage existing databases for matching image results and fails to address the issue of large search prompts.

To enhance the search results, certain aspects of embodiments are designed to extract additional keywords based on a conversation with the user to generate a refined search query. The refined search query is input to a search service and used to generate more targeted results.

Figure 4:
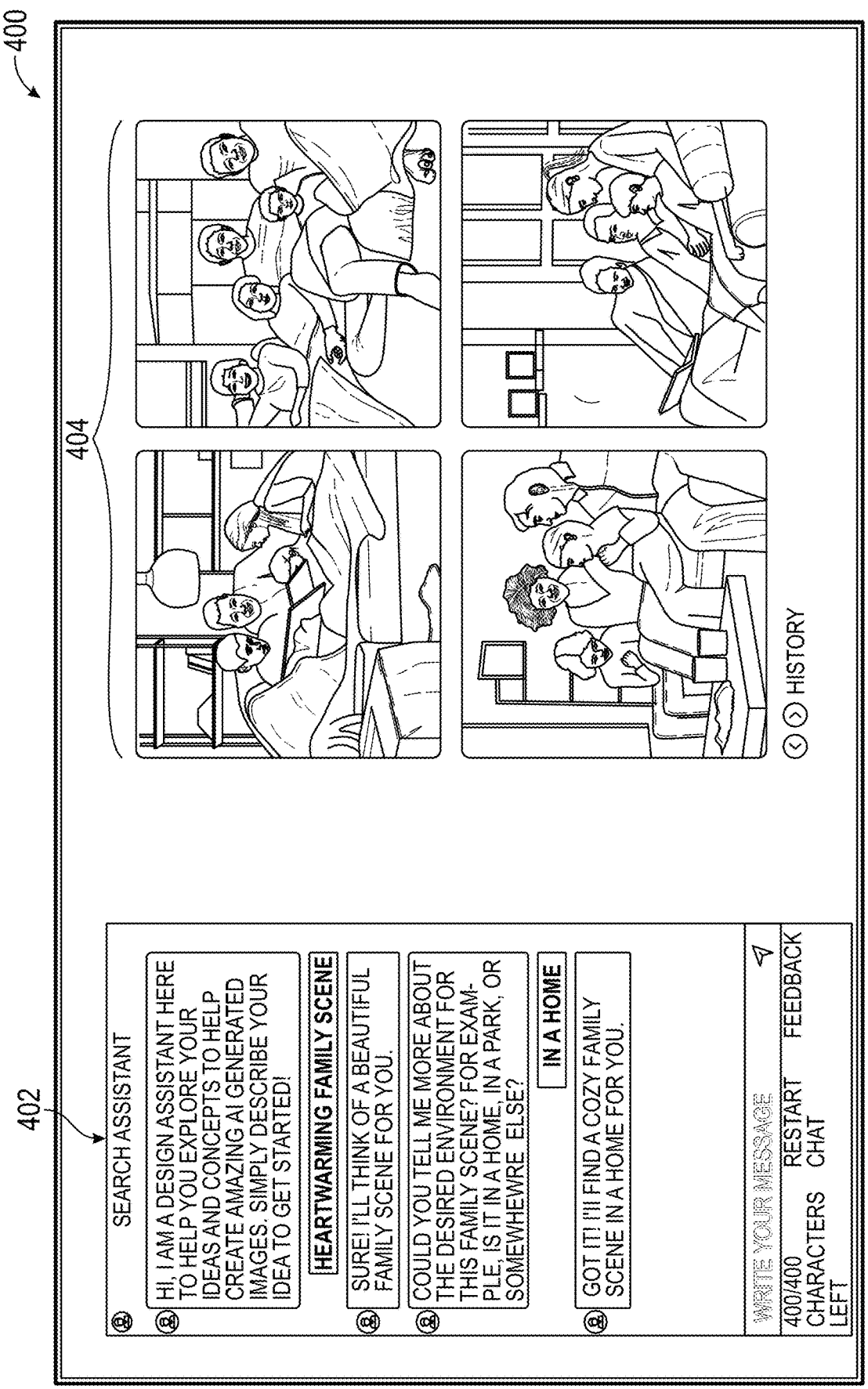
FIG. 4 illustrates an example view of an application configured for providing chat-powered search using artificial intelligence, in accordance with one or more implementations.

FIG. 4 illustrates an example view 400 of an application configured for providing chat-powered search using AI to further enhance search queries, in accordance with one or more implementations. In the view 400, the application addresses the challenge of enabling users to construct effective search queries, which, despite always yielding results, can be complex and non-intuitive for users to formulate. Some implementations may employ interactions through a chat-based interface 402 to elicit detailed information from users. This interactive process may be utilized to incrementally develop a search query comprising the appropriate keywords to provide results that are more likely to align with the user's search intent, thereby enhancing the overall search experience with more relevant results 404.

Figure 5:
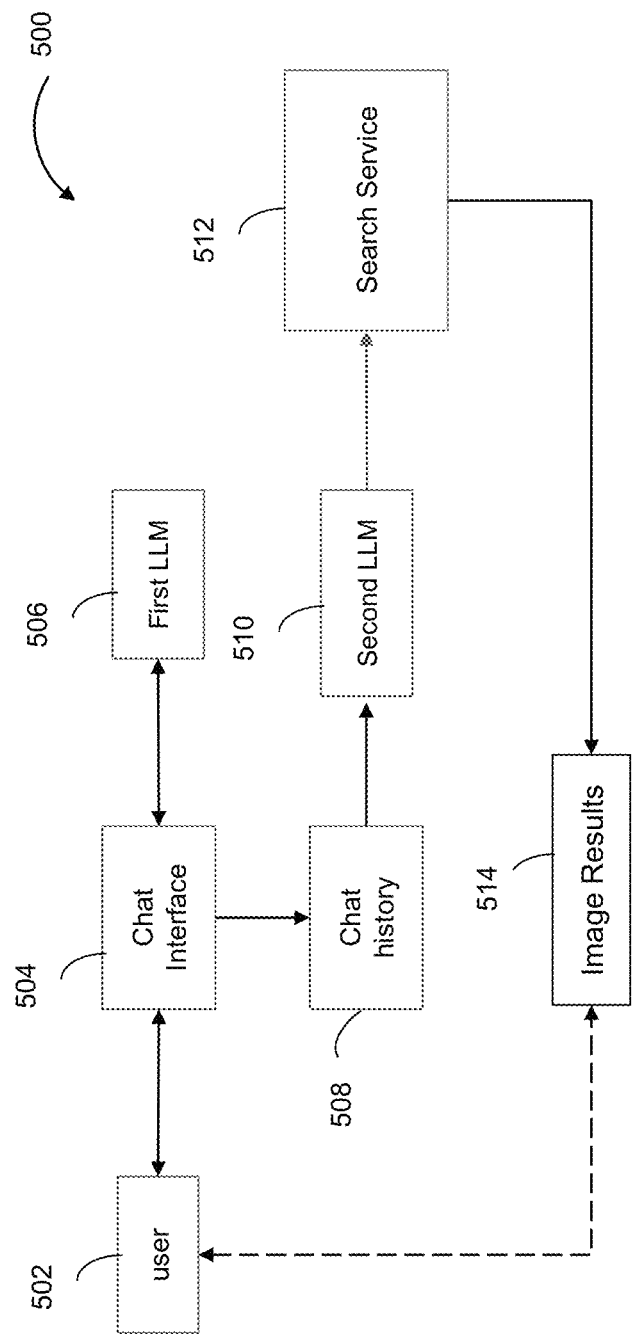
FIG. 5 illustrates an example flow diagram for providing chat-powered search using artificial intelligence, in accordance with one or more implementations.

FIG. 5 illustrates an example flow diagram 500 for providing chat-powered search using AI, in accordance with one or more implementations. A user 502 may provide creative requests to a chat interface 504 and receive back questions. The chat interface 504 may be communicatively coupled to a first LLM 506 configured to respond with natural language, e.g., asking questions. A chat history 508 from the chat interface 504 may be provided to a second LLM 510 configured to build detailed search queries (e.g., vector-based, semantic, etc.). For exemplary purposes, the first LLM 506 and the second LLM 510 are illustrated as two separate models but may be the same model or one or more models integrated with the chat-powered search to provide optimal search results. The second LLM 510 may provide relatively large search queries comprising keywords determined based on the conversation (i.e., chat history 508) to a search service 512. The search service 512 is configured to return query results based on existing assets (e.g., images) in, for example, a database(s). The search service 512 may provide the image results 514 as an output to a client device of the user 502. The user 502 may download, share, report, etc., the image results 514.

Figure 6:
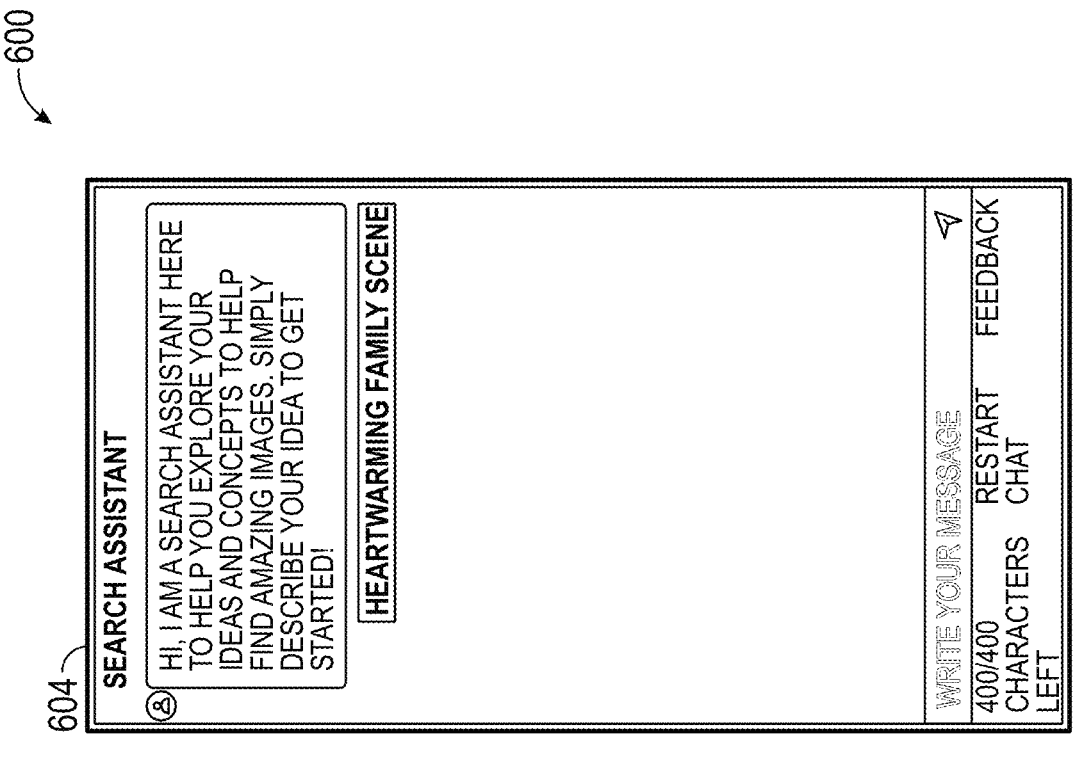
FIG. 6 illustrates exemplary views of an application configured for providing chat-powered search using artificial intelligence, in accordance with one or more implementations.
Figure 6:
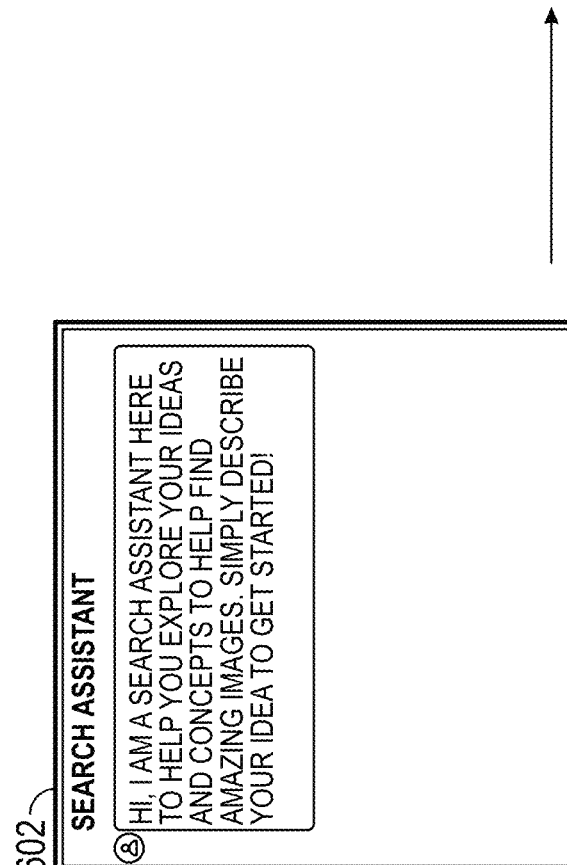

FIG. 6 illustrates exemplary views 600 of an application configured for providing chat-powered search using AI, in accordance with one or more implementations. The view 600 shows a chat-based interface 602 through which a user may interact with the application. The chat-based interface 602 may be triggered based one or more criteria. By non-limiting example, the user may request the assistance. By non-limiting example, the chat-based interface 602 may be automatically triggered based on suboptimal results. By non-limiting example, the chat-based interface 602 may be activated based on a predetermined number of search errors, or when output results are far too extensive (e.g., due to overly broad search inputs by the user). The chat-based interface 604 shows an example input from the user describing an idea for an image (e.g., "heartwarming family scene"). The conversation may continue between the user and the search assistant. In some implementations, the user must answer at least one questions. In some implementations, the user must answer a predetermined number of questions. In some implementations, the user must answer questions until the LLM (e.g., the second LLM 510) has sufficient keyword intake to generate a detailed query.

Figure 7A:
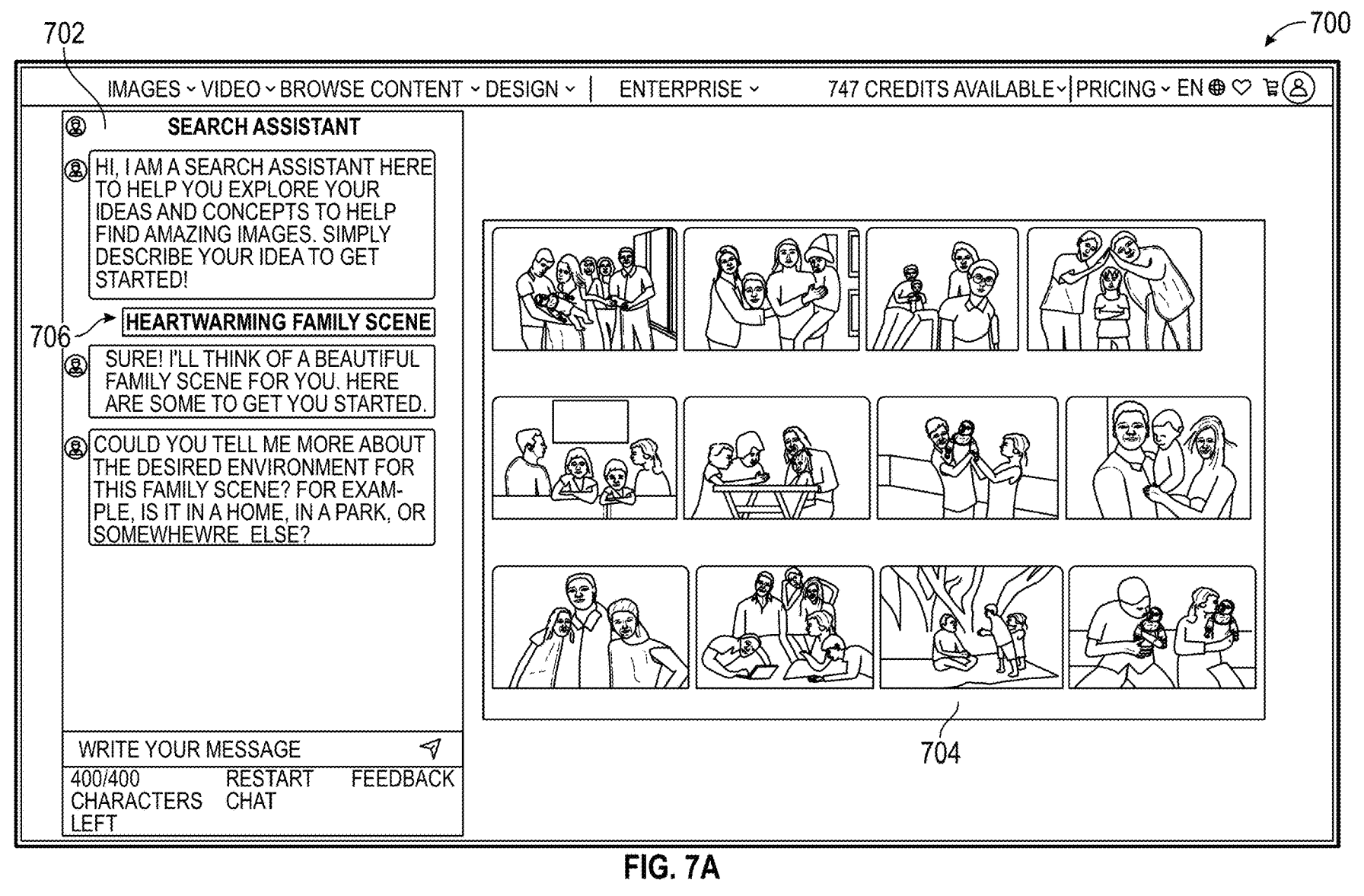
Figure 7B:
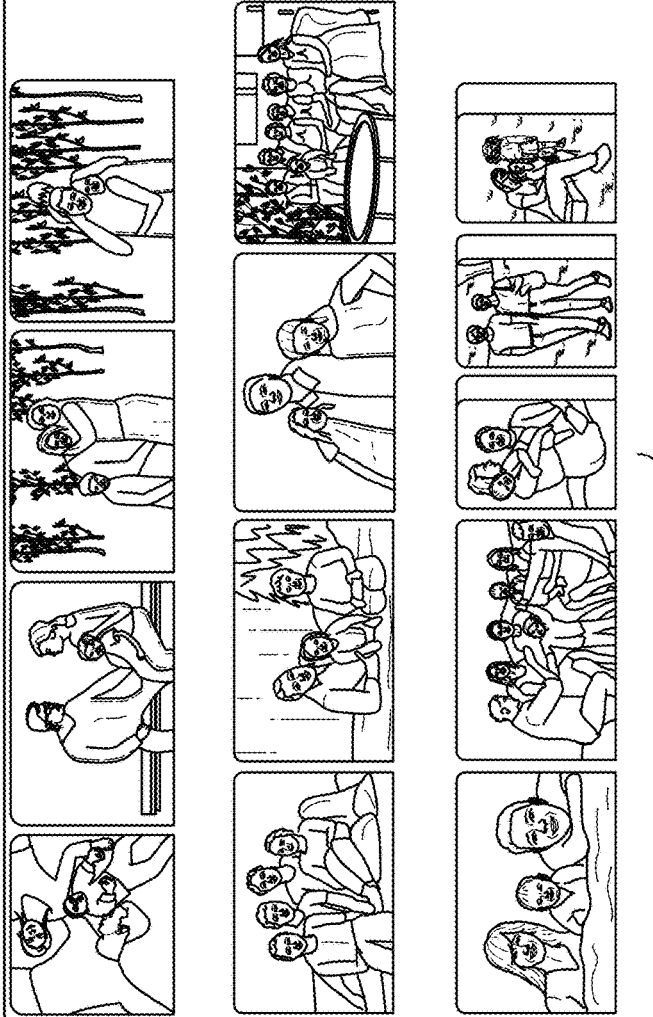
Figure 7C:
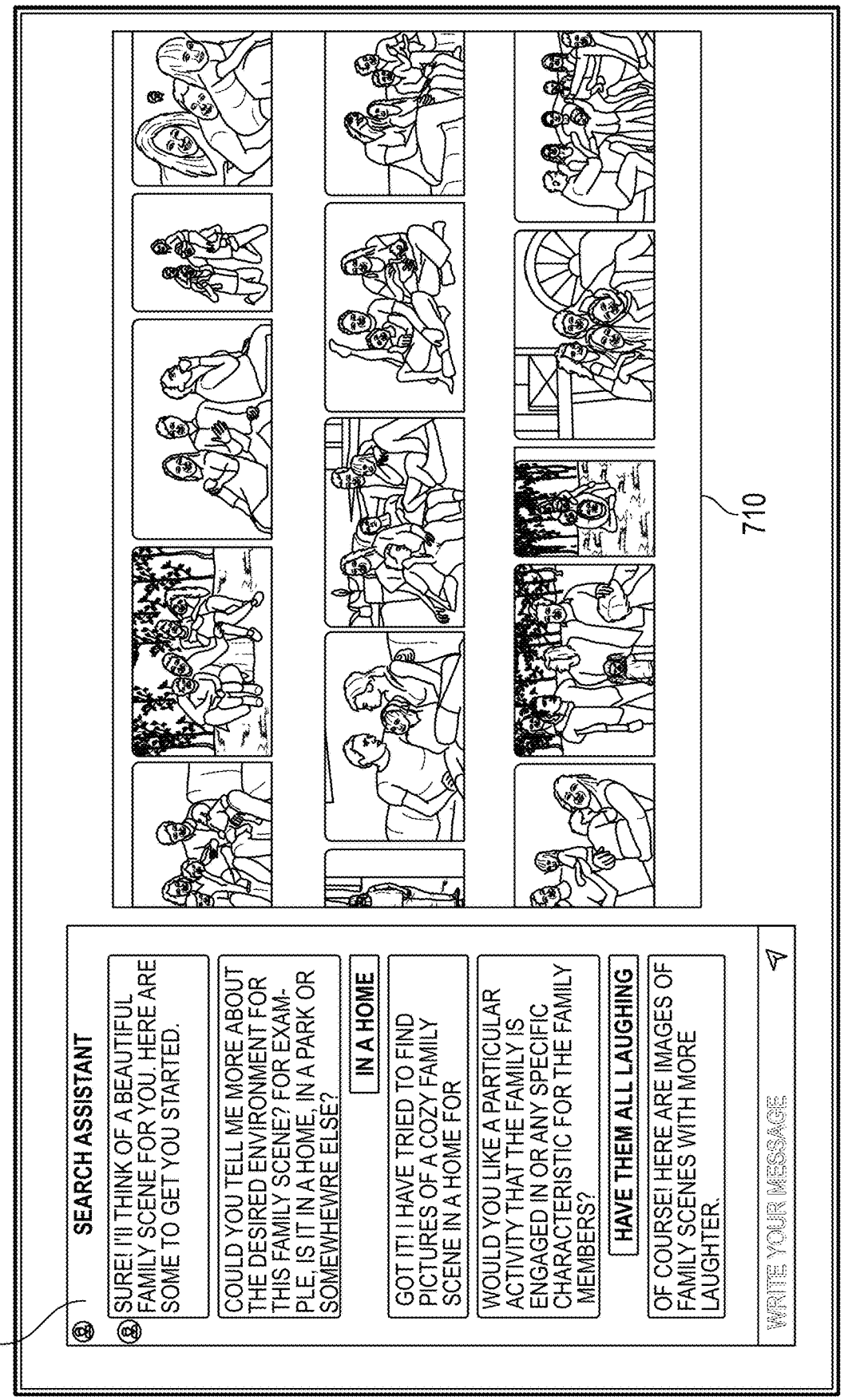

FIGS. 7A, 7B, and 7C illustrate a series of example views 700 of an application configured for providing chat-powered search using AI and corresponding search results, in accordance with one or more implementations. In FIG. 7A, the view 700 shows a chat-based interface 702 through which a user may interact with the application. The first search results 704 are obtained from using the user input 706 as a search query (e.g., vector-based, semantic, etc.) to a search service (e.g., search service 512). An LLM (e.g., first LLM 506) digests the conversation so far and generates additional questions that align with the conversation. The application prompts the user for more details about the desired asset (e.g., a desired environment, theme, or the like) using the generated questions.

In FIG. 7B, the view 700 shows the chat-based interface 702 with input from the user responding to the applications prompt for more details (e.g., "in a home"). The first search results 704 are updated and second search results 708 are obtained using an updated search query determined based on history of user responses. The search results are continuously updated as user input is accumulated in real-time. For example, the application may determine, based on the chat history (e.g., "heartwarming family scene" and "in a home"), a refined search query (e.g., "heartwarming family scene, the setting is a cozy and inviting living room, bathed in the soft, golden glow of the late afternoon sun streaming through sheer curtains. The room is filled with a sense of comfort and togetherness.").

In FIG. 7C, the view 700 shows the chat-based interface 702 in which the application prompts the user for more details about the desired asset (e.g., desired activity or specific characteristics). The user may respond, via the chat-based interface 702, to the applications prompt for more details (e.g., "have them all be laughing"). The search results are updated again (from the second search results 708) to a more refined search result 710 obtained using a search query determined by the application based on the compilation of user responses. For example, the search query may be updated to "laughing family, cozy and inviting living room, bathed in the soft, golden glow of the late afternoon sun."

The disclosed system(s) address a problem in traditional search techniques tied to computer technology, namely, the technical problem of formulating effective search queries that yield relevant asset results. The disclosed system solves this technical problem by providing a solution also rooted in computer technology, namely, by providing for chat-powered search using AI. The disclosed subject technology further provides improvements to the functioning of the computer itself because it improves processing and efficiency in search.

Figure 8:
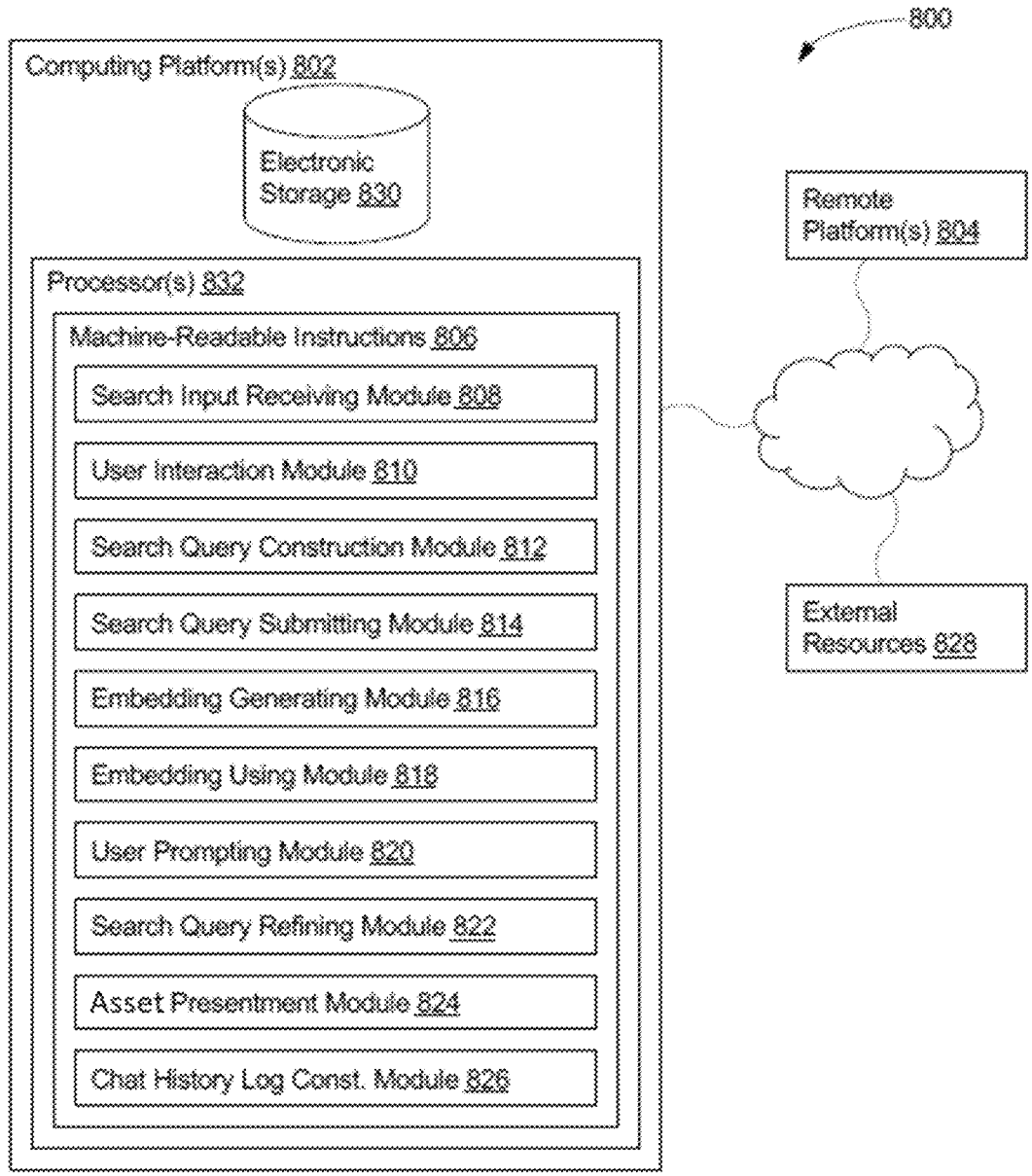
FIG. 8 illustrates a system configured for search, in accordance with one or more implementations.

FIG. 8 illustrates a system 800 configured for search, according to certain aspects of the disclosure. In some implementations, system 800 may include one or more computing platforms 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/ or according to a client/server architecture, a peer-to-peer architecture, and/or other architectures. Users may access system 800 via remote platform(s) 804.

Computing platform(s) 802 may be configured by machine-readable instructions 806. Machine-readable instructions 806 may include one or more instruction modules. The instruction modules may include computer program modules. The instruction modules may include one or more of search input receiving module 808, user interaction module 810, search query construction module 812, search query submitting module 814, embedding generating module 816, embedding using module 818, user prompting module 820, search query refining module 822, asset presentment module 824, chat history log construction module 826, and/or other instruction modules.

Search input receiving module 808 may be configured to receive a first search input from a user describing a desired asset. The user may be prompted to provide feedback on specific attributes of the desired asset. The desired asset may be an image, video, object, canvas, graphic, audio, document, interactive content, or the like.

User interaction module 810 may be configured to interact with the user via a chat interface to solicit additional details about the desired asset in response to the first search input. The chat interface may include a visual representation of the conversational exchange. By way of non-limiting example, the additional details solicited from the user may include preferences regarding the composition, mood, and setting of the desired asset.

Search query construction module 812 may be configured to construct a search query based on the first search input and the additional details solicited from the user. These preferences may be incorporated into the search query.

Search query submitting module 814 may be configured to submit the search query to a search service to retrieve relevant asset data for the user. The search service may be configured to handle queries with complex user intents.

Embedding generating module 816 may be configured to generate an embedding based on the search query. The embedding may be a vector representation of the search query or asset used to search for assets.

Embedding using module 818 may be configured to use the embedding to retrieve asset data concerning assets that are relevant to the search query. The asset data may be retrieved from a database containing assets with associated embeddings. The asset data may include a list of assets most relevant to the search query. The embedding may be used to identify similar asset-associated embeddings that indicate the assets' relevance to the search query. In this manner, a list of assets most relevant to the search query is retrieved.

User prompting module 820 may be configured to prompt the user with specific questions related to the desired asset characteristics. The questions may be formulated by a large language model based on the first search input and the additional details solicited from the user.

Search query refining module 822 may be configured to refine the search query in response to a second user input from the user describing additional details about the desired asset. Results from the refined search query may be provided for presentation to the user in real time or near-real time.

Asset presentment module 824 may be configured to present a plurality of assets to the user based on the search query. The user may be enabled to provide feedback on the presented assets to further refine the search query.

Chat history log construction module 826 may be configured to construct a chat history log that records the interactive conversational exchange. The chat history log may be utilized to inform the construction of the search query.

In some implementations, the visual representation may be updated in real-time as the conversational exchange progresses. In some implementations, the search query may be constructed to reflect the nuanced user intent as derived from the conversational exchange. In some implementations, by way of non-limiting example, the specific attributes may include one or more of color scheme, lighting conditions, or presence of specific objects or characters.

In some implementations, computing platform(s) 802, remote platform(s) 804, and/or external resources 828 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 802, remote platform(s) 804, and/or external resources 828 may be operatively linked via some other communication media.

A given remote platform 804 may include one or more processors configured to execute computer program modules. The computer program modules may be configured to enable an expert or user associated with the given remote platform 804 to interface with system 800 and/or external resources 828, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, and/or other computing platforms.

External resources 828 may include sources of information outside of system 800, external entities participating with system 800, and/or other resources. In some implementations, some or all of the functionality attributed herein to external resources 828 may be provided by resources included in system 800.

Computing platform(s) 802 may include electronic storage 830, one or more processor(s) 832, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 830 may comprise non-transitory storage media that electronically stores information. The electronic storage media of electronic storage 830 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 830 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 830 may include one or more virtual storage resources (e.g., cloud storage, a virtual private network, and/or other virtual storage resources). Electronic storage 830 may store software algorithms, information determined by processor(s) 832, information received from computing platform(s) 802, information received from remote platform(s) 804, and/or other information that enables computing platform(s) 802 to function as described herein.

Processor(s) 832 may be configured to provide information processing capabilities in computing platform(s) 802. As such, processor(s) 832 may include one or more of a digital processor, an analog processor, a digital circuit designed to process information, an analog circuit designed to process information, a state machine, and/or other mechanisms for electronically processing information. Although processor(s) 832 is shown in FIG. 8 as a single entity, this is for illustrative purposes only. In some implementations, processor(s) 832 may include a plurality of processing units. These processing units may be physically located within the same device, or processor(s) 832 may represent processing functionality of a plurality of devices operating in coordination. Processor(s) 832 may be configured to execute modules 808, 810, 812, 814, 816, 818, 820, 822, 824, and/or 826, and/or other modules. Processor(s) 832 may be configured to execute modules 808, 810, 812, 814, 816, 818, 820, 822, 824, and/or 826, and/or other modules by software; hardware; firmware; some combination of software, hardware, and/or firmware; and/or other mechanisms for configuring processing capabilities on processor(s) 832. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, 814, 816, 818, 820, 822, 824, and/or 826 are illustrated in FIG. 8 as being implemented within a single processing unit, in implementations in which processor(s) 832 includes multiple processing units, one or more of modules 808, 810, 812, 814, 816, 818, 820, 822, 824, and/or 826 may be implemented remotely from the other modules. The description of the functionality provided by the different modules 808, 810, 812, 814, 816, 818, 820, 822, 824, and/or 826 described below is for illustrative purposes, and is not intended to be limiting, as any of modules 808, 810, 812, 814, 816, 818, 820, 822, 824, and/or 826 may provide more or less functionality than is described. For example, one or more of modules 808, 810, 812, 814, 816, 818, 820, 822, 824, and/or 826 may be eliminated, and some or all of its functionality may be provided by other ones of modules 808, 810, 812, 814, 816, 818, 820, 822, 824, and/or 826. As another example, processor(s) 832 may be configured to execute one or more additional modules that may perform some or all of the functionality attributed below to one of modules 808, 810, 812, 814, 816, 818, 820, 822, 824, and/or 826.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 9:
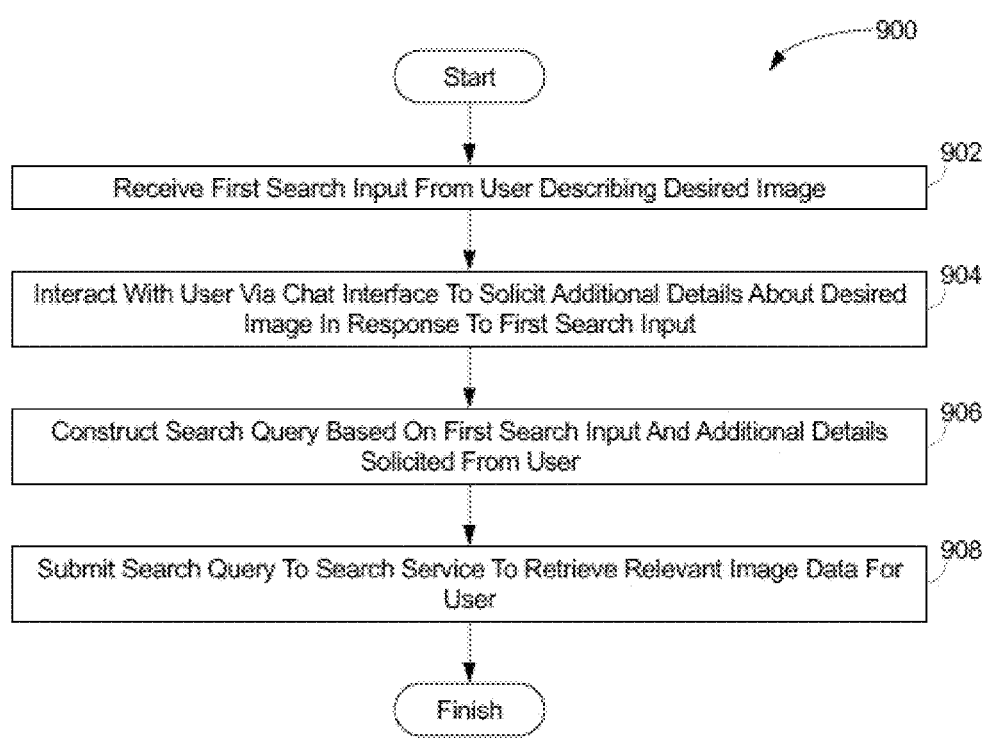
FIG. 9 illustrates an example flow diagram for search, according to certain aspects of the disclosure.

FIG. 9 illustrates an example flow diagram (e.g., process 900) for search, according to certain aspects of the disclosure. For explanatory purposes, the example process 900 is described herein with reference to FIG. 1-9. Further for explanatory purposes, the steps of the example process 900 are described herein as occurring in serial, or linearly. However, multiple instances of the example process 900 may occur in parallel. For purposes of explanation of the subject technology, the process 900 will be discussed in reference to FIG. 1-8.

At step 902, the process 900 may include receiving a first search input from a user describing a desired asset. At step 904, the process 900 may include interacting with the user via a chat interface to solicit additional details about the desired asset in response to the first search input. At step 906, the process 900 may include constructing a search query based on the first search input and the additional details solicited from the user. At step 908, the process 900 may include submitting the search query to a search service to retrieve asset data corresponding to assets that are relevant to the search query. The relevant asset data may then be provided to the user.

For example, as described above in relation to FIG. 8, at step 902, the process 900 may include receiving a first search input from a user describing a desired asset, through search input receiving module 808. At step 904, the process 900 may include interacting with the user via a chat interface to solicit additional details about the desired asset in response to the first search input, through user interaction module 810. At step 906, the process 900 may include constructing a search query based on the first search input and the additional details solicited from the user, through search query construction module 812. At step 908, the process 900 may include submitting the search query to a search service to retrieve relevant asset data corresponding to assets that are relevant to the search query, through search query submitting module 814.

According to an aspect, the process 900 may include generating an embedding based on the search query and using the embedding to retrieve the relevant asset data from a database containing assets with associated embeddings. The relevant asset data may include a list of assets most relevant to the search query.

According to an aspect, the process 900 may include prompting the user with specific questions related to the desired asset characteristics, wherein the questions are formulated by a large language model based on the first search input and the additional details solicited from the user.

According to an aspect, the process 900 may include refining the search query in response to a second user input from the user describing additional details about the desired asset. Results from the refined search query may be provided for presentation to the user in real time or near-real time.

According to an aspect, the process 900 may include presenting a plurality of assets to the user based on the search query, wherein the user is enabled to provide feedback on the presented assets to further refine the search query.

According to an aspect, the process 900 may include constructing a chat history log that records the interactive conversational exchange, wherein the chat history log is utilized to inform the construction of the search query.

According to an aspect, the chat interface includes a visual representation of the conversational exchange, and the visual representation is updated in real-time as the conversational exchange progresses.

According to an aspect, the search service is configured to handle queries with complex user intents, and the search query is constructed to reflect the nuanced user intent as derived from the conversational exchange.

According to an aspect, the additional details solicited from the user include preferences regarding the composition, mood, and setting of the desired asset, and these preferences are incorporated into the search query.

According to an aspect, the user is prompted to provide feedback on specific attributes of the desired asset, such as color scheme, lighting conditions, or presence of specific objects or characters.

Figure 10:
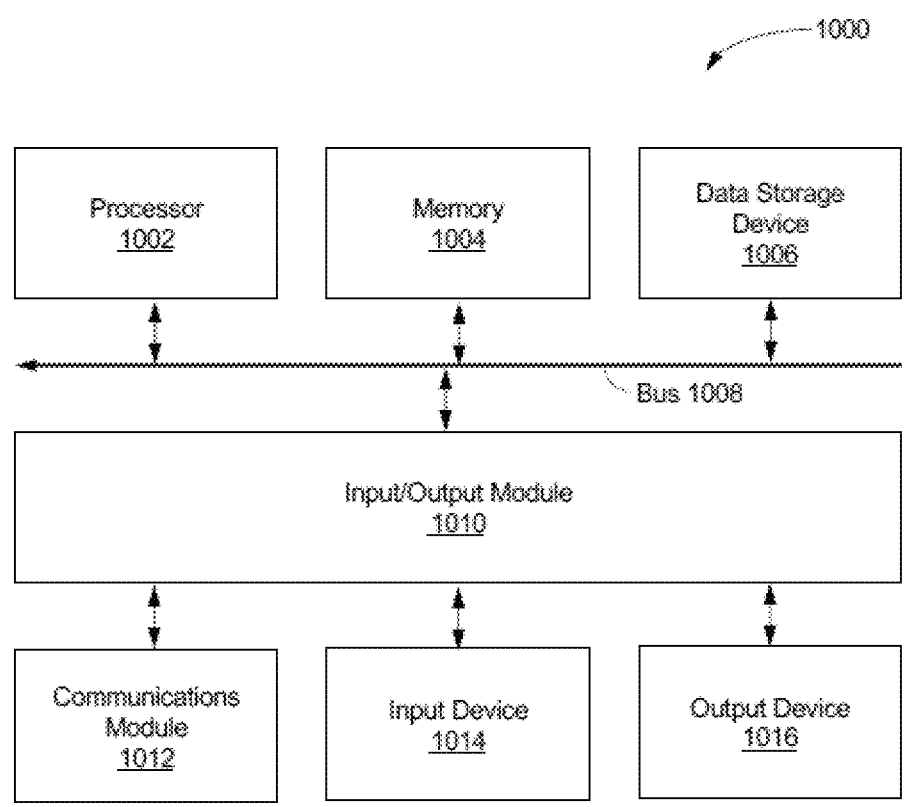
FIG. 10 is a block diagram illustrating an example computer system (e.g., representing both client and server) with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

Computer system 1000 (e.g., server and/or client) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described systems can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads data and provides to a user, information may be read from the data and stored in a memory device, such as the memory 1004. Additionally, data from the memory 1004 servers accessed via a network the bus 1008, or the data storage device 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage device 1006.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method for refining search queries through an interactive conversational exchange, comprising:
   receiving, from a user at a client device, a first search input describing a desired asset;
   interacting with the user via a chat interface in a conversational exchange to solicit additional details about the desired asset using prompts generated by a first large language model (LLM), the additional details comprising at least a first description of a desired setting of the desired asset;
   constructing, based on the conversational exchange including at least the first search input and the additional details, a complex-targeted search query to reflect complex user intents using a second LLM, wherein the complex user intents involve semantic meaning derived from user responses to the prompts provided to user via the chat interface;
   identifying, using a search service, a plurality of assets associated with the search query, wherein the search service is configured to handle queries with the complex user intents; and
   presenting the plurality of assets on a display screen of the client device, the display screen including at least the chat interface and results of the search service comprising the plurality of assets, the results being dynamically updated in response to user inputs received via the chat interface.

2. The method of claim 1, further comprising:
   submitting the search query to the search service to retrieve asset data;
   generating an embedding based on the search query; and
   retrieving, using the embedding, the plurality of assets that are relevant to the search query from a database containing assets with associated embeddings.

3. The method of claim 1, further comprising prompting the user with specific questions related to characteristics of the desired asset, wherein the questions are formulated by a large language model based on the first search input and the additional details solicited from the user.

4. The method of claim 1, further comprising refining the search query in response to a second user input from the user describing additional details about the desired asset, wherein results from the refined search query are provided for presentation to the user.

5. The method of claim 1, wherein the user is enabled to provide feedback on the presented plurality of assets to further refine the search query.

6. The method of claim 1, further comprising constructing a chat history log that records the interactive conversational exchange, wherein the chat history log is utilized to inform the construction of the search query.

7. The method of claim 1, wherein the chat interface includes a visual representation of the interactive conversational exchange, and wherein the visual representation is updated in real-time as the interactive conversational exchange progresses.

8. The method of claim 1, wherein the additional details solicited from the user include a second description of a composition within the desired asset and a third description of a mood of the desired asset, wherein the first and second descriptions are incorporated into the search query.

9. The method of claim 1, wherein the user is prompted to provide feedback on specific attributes of the desired asset, and wherein the specific attributes include one or more of color scheme, lighting conditions, or presence of specific objects or characters.

10. A system configured for refining search queries through an interactive conversational exchange, the system comprising:
   one or more hardware processors configured by machine-readable instructions to:
      receive, from a user at a client device, a first search input describing a desired asset;
      interact with the user via a chat interface in a conversational exchange to solicit additional details about the desired asset, the additional details comprising at least a first description of a desired setting of the desired asset;
      construct, based on the conversational exchange including at least the first search input and the additional details, a complex-targeted search query to reflect complex user intents, wherein the complex user intents involve semantic meaning derived from user responses to prompts provided to user via the chat;
      identify, using a search service, a plurality of assets associated with the search query, wherein the search service is configured to handle queries with the complex user intents; and
      present the plurality of assets on a display screen of the client device, the display screen including at least the chat interface and results of the search service comprising the plurality of assets, the results being dynamically updated in response to user inputs received via the chat interface.

11. The system of claim 10, wherein the one or more hardware processors are further configured by machine-readable instructions to:
submit the search query to the search service to retrieve asset data;
generate an embedding based on the search query; and
retrieve, using the embedding, the plurality of assets that are relevant to the search query from a database containing assets with associated embeddings.

12. The system of claim 10, wherein the one or more hardware processors are further configured by machine-readable instructions to prompt the user with specific questions related to characteristics of the desired asset, wherein the questions are formulated by a large language model based on the first search input and the additional details solicited from the user.

13. The system of claim 10, wherein the one or more hardware processors are further configured by machine-readable instructions to refine the search query in response to a second user input from the user describing additional details about the desired asset, wherein results from the refined search query are provided for presentation to the user.

14. The system of claim 10, wherein the user is enabled to provide feedback on the presented plurality of assets to further refine the search query.

15. The system of claim 10, wherein the one or more hardware processors are further configured by machine-readable instructions to construct a chat history log that records the interactive conversational exchange, wherein the chat history log is utilized to inform the construction of the search query.

16. The system of claim 10, wherein the chat interface includes a visual representation of the interactive conversational exchange, and wherein the visual representation is updated in real-time as the interactive conversational exchange progresses.

17. The system of claim 10, wherein the user is prompted to provide feedback on specific attributes of the desired asset, and wherein the specific attributes include one or more of color scheme, lighting conditions, or presence of specific objects or characters.

18. A non-transient computer-readable storage medium having instructions embodied thereon, the instructions being executable by one or more processors to perform a method for refining search queries through an interactive conversational exchange, the method comprising:
receiving, from a user at a client device, a first search input describing a desired asset;
interacting with the user via a chat interface in a conversational exchange to solicit additional details about the desired asset, the additional details comprising at least a first description of a desired setting of the desired asset;
constructing, based on the conversational exchange including at least the first search input and the additional details, a complex-targeted search query to reflect complex user intents, wherein the complex user intents involve semantic meaning derived from user responses to prompts provided to user via the chat interface;
identifying, using a search service, a plurality of assets associated with the search query, wherein the search service is configured to handle queries with the complex user intents; and
presenting the plurality of assets on a display screen of the client device, the display screen including at least the chat interface and results of the search service comprising the plurality of assets, the results being dynamically updated in response to user inputs received via the chat interface.

* * * * *